(12) United States Patent
Pizio

(10) Patent No.: US 10,656,734 B2
(45) Date of Patent: May 19, 2020

(54) COMPUTER KEYBOARD WRIST SUPPORT SYSTEM

(71) Applicant: Dennis Pizio, Palm Beach Gardens, FL (US)

(72) Inventor: Dennis Pizio, Palm Beach Gardens, FL (US)

( * ) Notice: Subject to any disclaimer, the term of this patent is extended or adjusted under 35 U.S.C. 154(b) by 0 days.

(21) Appl. No.: 15/207,262

(22) Filed: Jul. 11, 2016

(65) Prior Publication Data

US 2017/0010683 A1 Jan. 12, 2017

Related U.S. Application Data

(63) Continuation-in-part of application No. 15/063,351, filed on Mar. 7, 2016, now abandoned.

(60) Provisional application No. 62/190,854, filed on Jul. 10, 2015, provisional application No. 62/128,917, filed on Mar. 5, 2015.

(51) Int. Cl.
*G06F 3/039* (2013.01)
*G06F 3/0354* (2013.01)
*G06F 3/02* (2006.01)

(52) U.S. Cl.
CPC ............ *G06F 3/039* (2013.01); *G06F 3/0202* (2013.01); *G06F 3/03543* (2013.01); *G06F 2203/0333* (2013.01)

(58) Field of Classification Search
CPC ................. G06F 3/039; A47B 21/0371; A47B 2021/0392
See application file for complete search history.

(56) References Cited

U.S. PATENT DOCUMENTS

| | | | | |
|---|---|---|---|---|
| 4,976,407 A | * | 12/1990 | Schwartz | A47B 21/0371 400/715 |
| 5,288,042 A | * | 2/1994 | Grimm | A47B 21/0371 248/118 |
| 5,513,824 A | * | 5/1996 | Leavitt | A47B 21/0371 400/715 |
| 7,828,489 B1 | * | 11/2010 | Hargreaves | G06F 3/0208 400/472 |
| 2012/0162070 A1 | * | 6/2012 | Nien | G06F 3/0312 345/157 |

\* cited by examiner

*Primary Examiner* — Kevin M Nguyen
(74) *Attorney, Agent, or Firm* — John Rizvi; John Rizvi, P.A.—The Patent Professor®

(57) ABSTRACT

A wireless computer keyboard assembly having a slidable user wrist support controllably extendable upwardly and selectively set to a user-defined height above a main keyboard body to support the wrist of a user during the use of said wireless computer keyboard.

2 Claims, 16 Drawing Sheets

COMPUTER KEYBOARD WRIST SUPPORT SYSTEM

CROSS-REFERENCE TO RELATED APPLICATION

This U.S. non-provisional patent application is a continuation-in-part of U.S. non-provisional patent application Ser. No. 15/063,351, filed on Mar. 7, 2016, which, in turn, claim the benefit of U.S. provisional patent application No. 62/128,917, filed on Mar. 5, 2015. Furthermore, this U.S. non-provisional patent application claims the benefit of U.S. provisional patent application No. 62/190,854, filed on Jul. 10, 2015. All of the above-referenced previously filed U.S. non-provisional and U.S. provisional patent applications are incorporated-by-reference herein in their entireties.

FIELD OF THE INVENTION

The present invention relates to an apparatus configured for use with a wireless computer keyboard to cause a user's hand and wrist to be in ergonomically correct positions relative to each other during its use, while providing positional adjustment of a distal palmar hand portion support to facilitate use by individuals having a wide range of hand sizes.

BACKGROUND OF THE INVENTION

Computer-induced health problems can be an umbrella term for various problems a computer user can develop from prolonged and incorrect computer use. The health problems that can arise from using computers can be generally defined as the many a computer user may experience from using computers extensively over a prolonged period of time in an inefficient manner. The inefficiency being that the computer user may have poor etiquette when using peripherals, such as a computer mouse and computer keyboard. The medical problem associated with computer-related work is carpal tunnel syndrome (CTS), a stress-related injury caused by repetitive movement of joints, especially the wrist, and can lead to numerous musculoskeletal problems. Carpal tunnel syndrome is a condition in which there is excessive pressure on the median nerve. This is the nerve in the wrist that allows feeling and movement to parts of the hand. Carpal tunnel syndrome can lead to numbness, tingling, weakness, or muscle damage in the hands and fingers.

Ideally, an ergonomically correct position for a user at a computer workstation has the wrist of the hand controlling the mouse in a neutral position, with no bending, the hand being relaxed and in straight alignment with the associated forearm. In operation, there should be no bending of the user's wrist and fingers should fall naturally downward over the controls of the mouse. The user should be able to move the mouse with a full arm movement, keeping the wrist straight and in line with a full arm movement, keeping the wrist straight and in line with his or her shoulder. In order to reduce and minimize repetitive motion injuries (RMI) for computer users, a palm support is often placed in front of the mouse to provide support for the palm of the hand during brief pauses. A good technical description of the problems confronting users of computer mice is set out in U.S. Pat. No. 5,414,445 to Kaneko et al., issued May 9, 1995.

Many solutions have been proposed for providing a hand positioning device for a computer mouse and computer keyboard, which are selectively attachable to the mouse or keyboard, and include a raised area to facilitate proper positioning of the user's hand to minimize carpal tunnel and other related injuries. However, a major limitation of these devices is that the do not provide an efficient means for enabling a user of the apparatus to adjust both the distance of the support device and the relative height for either the mouse or keyboard.

Accordingly, there remains a need in the art for an innovation that will overcome the deficiencies of past approaches and the problems that remain unsolved.

SUMMARY OF THE INVENTION

The present disclosure is generally directed to a wireless computer keyboard assembly having a wrist supporting subassembly and having a wrist supporting pad to cause a user's hand and wrist to be in an ergonomically correct position during the use of the keyboard, while providing a positional adjustment of a distal palmar hand support to facilitate use by individuals having a wide variety of hand sizes.

These and other features, aspects, and advantages of the invention will be further understood and appreciated by those skilled in the art by reference to the following written specification, claims, and appended drawings

BRIEF DESCRIPTION OF THE DRAWINGS

The preferred embodiments of the invention will hereinafter be described in conjunction with the appended drawings provided to illustrate and not to limit the invention, in which.

DETAILED DESCRIPTION OF PREFERRED IMPLEMENTATIONS

Figure 1:
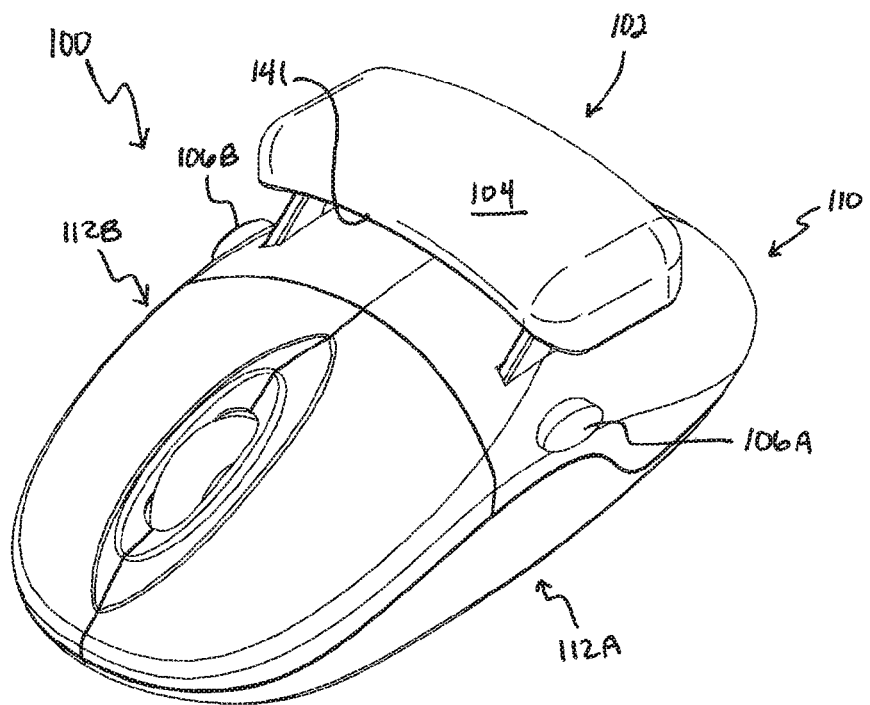
FIG. 1 is a top left isometric view of a wireless computer mouse wrist support assembly in accordance with a first exemplary implementation.
Figure 2:
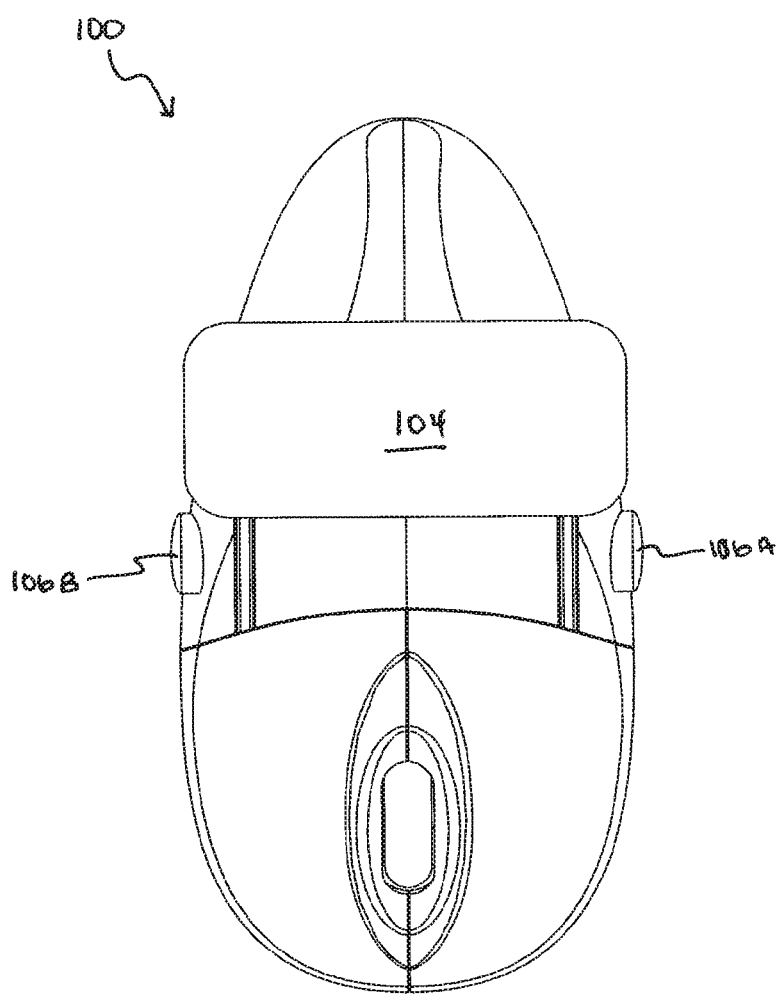
FIG. 2 is a top elevation view of the wireless computer mouse wrist support assembly of FIG. 1.
Figure 3:
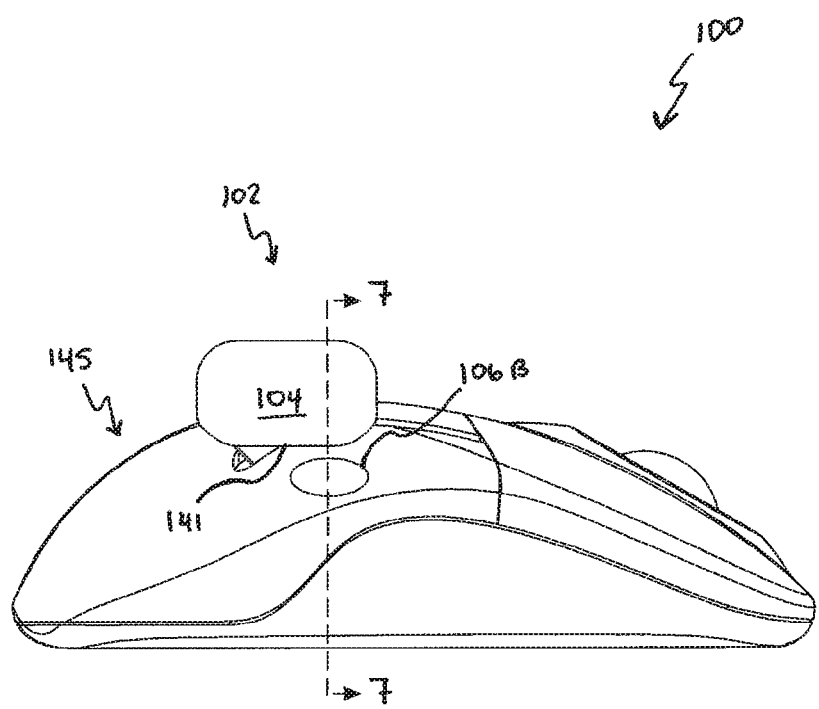
FIG. 3 is a right elevation view of the of the wireless computer mouse wrist support assembly of FIG. 1, wherein the height adjusting pad is shown in a lowest position.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to accompanying FIGS. 1-6, in an exemplary implementation of the present invention a wireless computer mouse assembly with an adjustable user wrist support 100 is provided, includes a user wrist support subassembly, shown generally as reference numeral 102, which has a wrist support platform pad 104, readily affixed the exterior surface of the wrist support platform 141. The wrist support platform 141 is integrally molded with a pair of support members 118A, 118B forming a unitary structure. Preferably, the user wrist support subassembly is located near the rear end 110 of the computer mouse assembly 100 spanning from the left 112A to the right side 112B of the computer mouse assembly 100. To the left 112A and right side 112B of the computer mouse assembly 100, respectively, are a pair of outwardly extending projections 106A and 106B, hereafter referenced as actuators, are integrally conjoined to a linear adjustment rack 128, resting upon a support member 163 within a defined cavity 143 of said body 132 (see FIG. 7). There are pair of actuators 106A and 106B on the lefts side 112A and right side 112B of the computer mouse assembly 100 that are selectively engageable, and allow a user to adjust the height of the wrist support assembly 102 of the computer mouse assembly 100.

Figure 4:
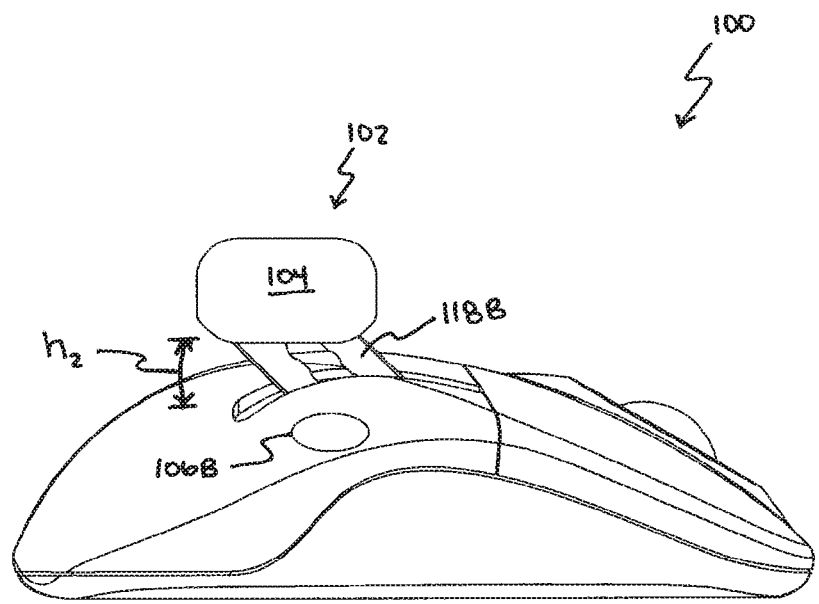
FIG. 4 is a right elevation view of the wireless computer mouse wrist support assembly of FIG. 1, wherein the height adjusting pad is shown in a mid-level position.
Figure 5:
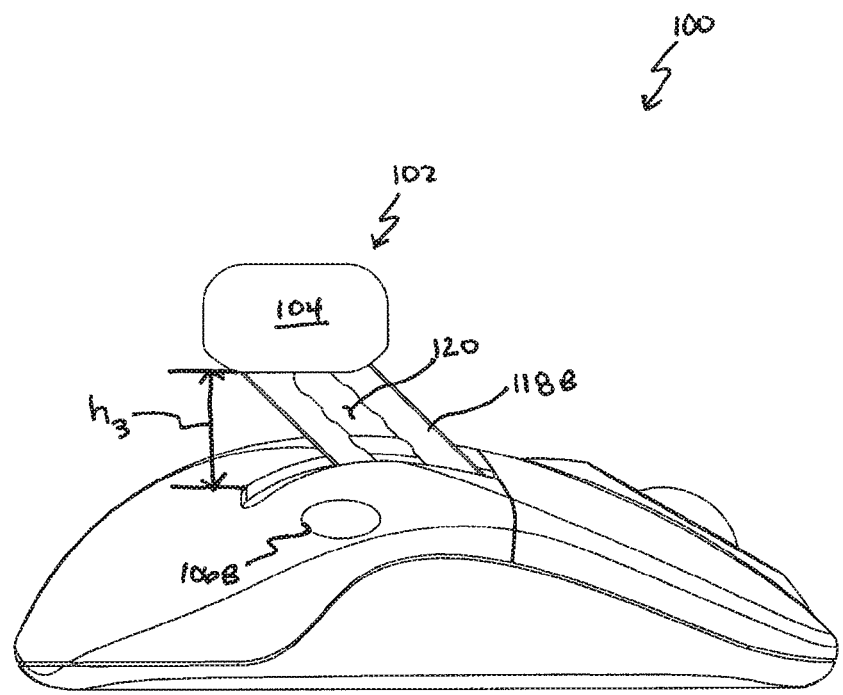
FIG. 5 is a right elevation view of the wireless computer mouse wrist support assembly of FIG. 1, wherein the height adjusting pad is shown in a highest possible position.
Figure 6:
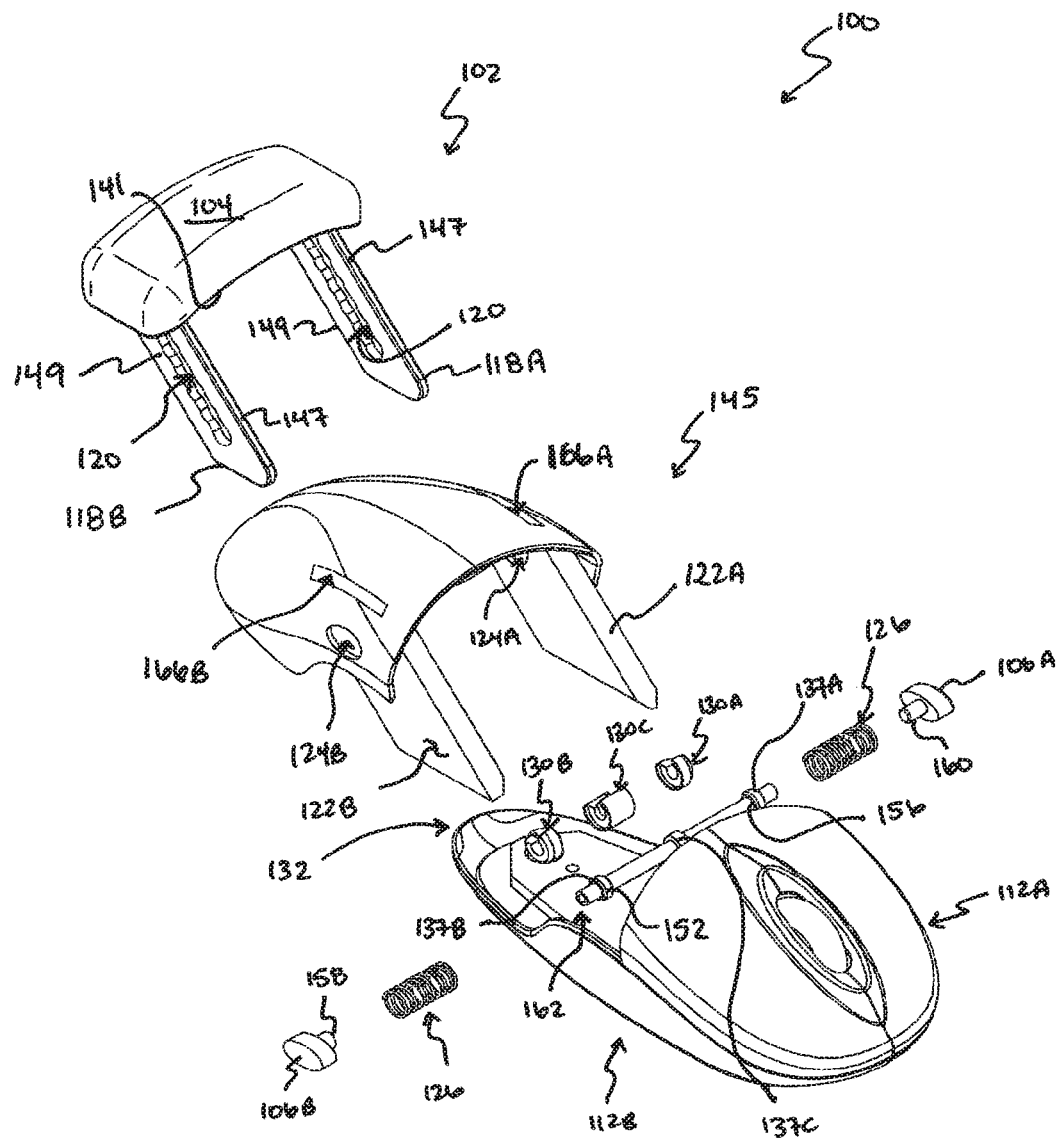
FIG. 6 is an exploded view of the computer mouse wrist support assembly of FIG. 1.

Referring now particularly to FIGS. 4-7, a wireless computer mouse assembly 100, includes a user wrist support subassembly 102. The height of the user wrist support subassembly having a wrist platform pad 104 can be adjusted incrementally. This is best shown in FIG. 4 and FIG. 5, illustrating the wrist support subassembly 102 shown at a middle height position h2, and the wrist support subassembly 102 shown at a max height h3.

The wrist support subassembly 102 is generally comprised of a wrist support platform pad 104, which is adhered to the top of the wrist support platform 141 integrally molded to support members 118A, 118B. Therebetween the front peripheral 147 and rear peripheral 149 of the support members 118A, 118B, is a contiguous length of excised steps 120. These excised steps 120 allow, approximately, one degree of freedom per step allowing the user to change the height of the wrist support pad 104 to a desirable height as needed for ultimate comfort. The wrist support subassembly's support platform 141 and support members 118A and 118B are contained inside a concave top 145 of the computer mouse assembly 100. The top 145 has a pair of apertures 124A, 124B, a pair of slots 166A and 166B, and a pair of elongated adjustment guides 122A, 122B.

The mouse body 132 of the wireless computer mouse assembly 100 has an interior cavity 143 to store batteries (not shown), and a linear adjustment rack 128. The linear adjustment rack 128 is comprised of a rod 129 having, preferably three, bosses 137A, 137B, and 137C, evenly spaced there between the outer edges thereof and translatable between said rod 139. The outward surface 150 of clip 130B coincides with the interior surface 152 of boss 137B. Likewise, the outward surface 154 of clip 130A coincides with the interior surface 156 of boss 137A, and clip 137C is concentrically affixed with boss 137C. Extending there between clip 130A and 130C, and clip 130B and clip 130C, is a compression spring 126 that produces, while in a state of "rests", an outward force pushing boss 137A and 137B outwardly when uncompressed.

Figure 7:
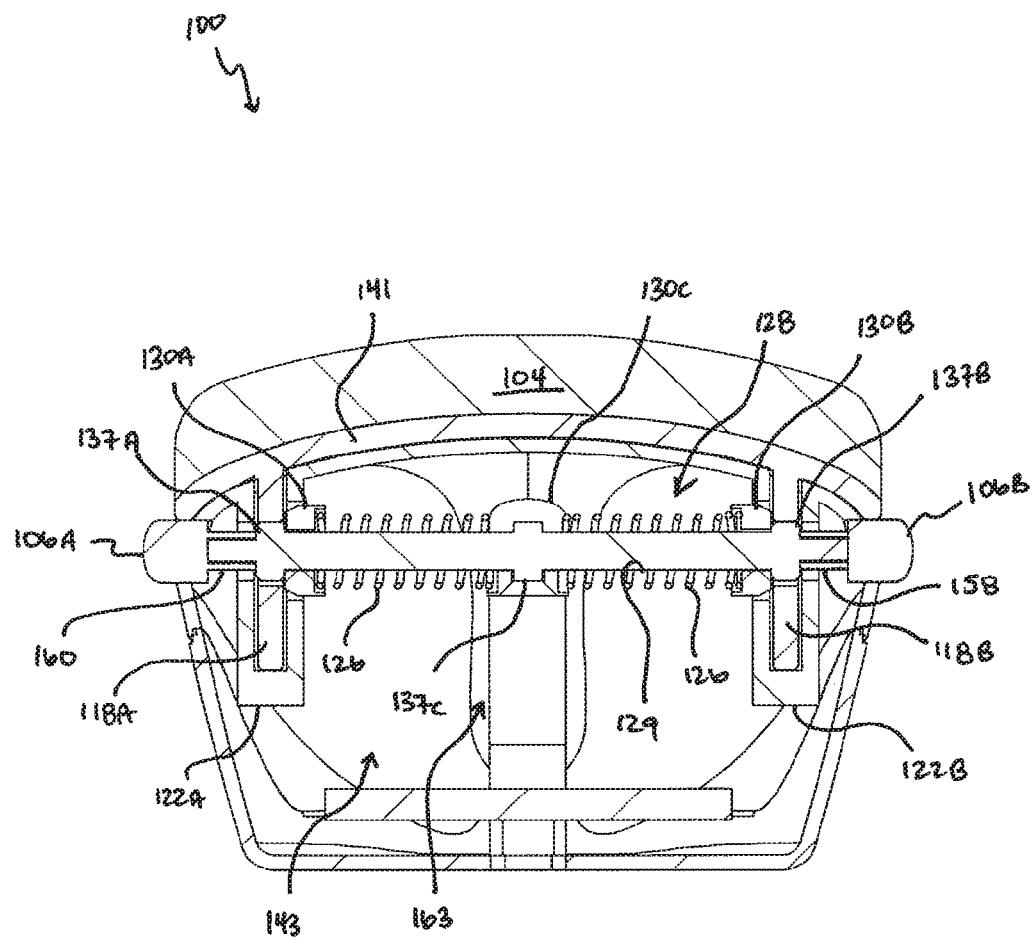
FIG. 7 is a cross-sectional view of the computer mouse wrist support assembly of FIG. 3, illustrating a locked position of the wrist support pad of the computer mouse wrist support assembly.

As best illustrated in FIG. 7, shows a cross-sectional view of the wireless computer mouse wrist support subassembly's 102 linear adjustment rack 128 in a locked position. When in a locked position, the compression spring 126 spanning laterally from clip 130C pushes outwardly clips 130A and 130B, which, in turn, respectively pushes boss 137A and 137B located on the outermost portion 162 of rod 129. This causes boss 137A and 137B to rest inside a cavity defined by a series of excised steps 120 integrated to support members 118B and 118A, preventing the vertical translation of the said members. Alternatively, to go from a locked to an unlocked position, as a way of example (not shown), both actuators 106A and 106B, having outwardly extending protrusions 158, 160, and generally press-fitted to the outer edge 162 of rod 129, must be depressed. When the pair of actuators 106A and 106B are depressed, both outward bosses 137A and 137B translate inward, which in turn, causes compression spring 126 to compress inward applying bilateral pressure to clip 130C. This allows for support members 118A and 118B to translate vertically giving the user of the wireless computer mouse freedom to increase or decrease the height level of the wrist support pad 104 as desired.

Figure 8:
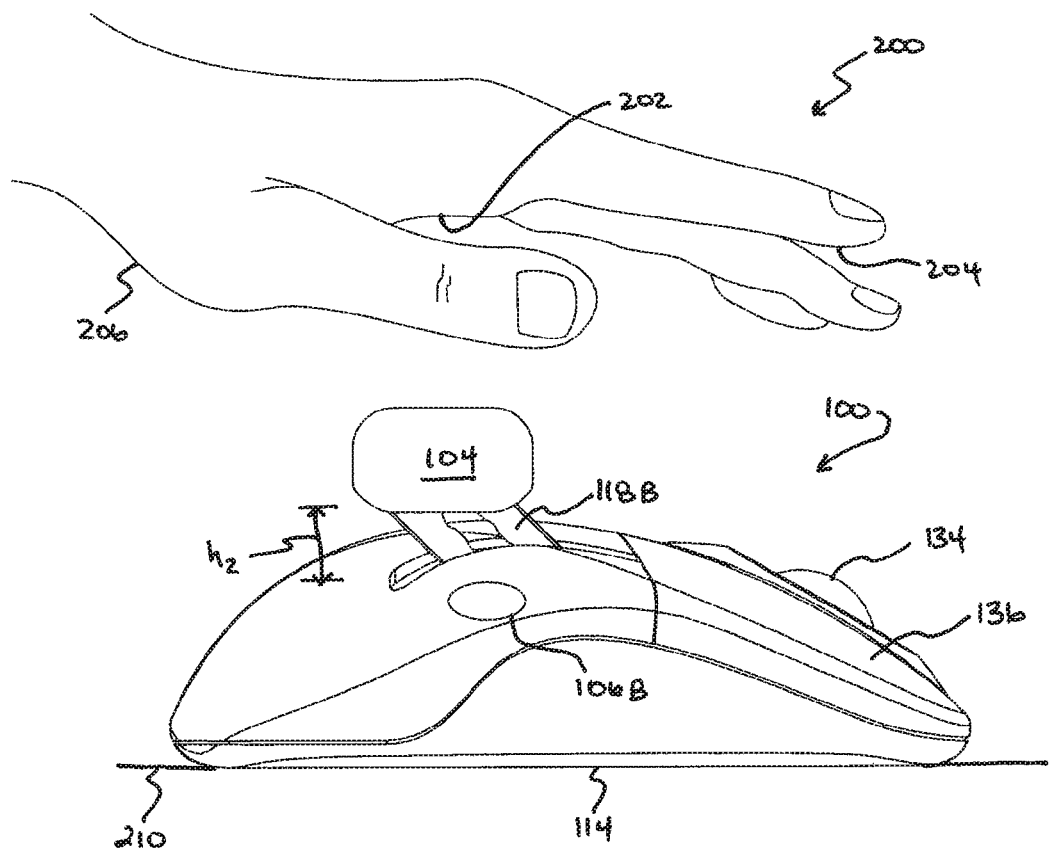
FIG. 8 is a right elevation view of the wireless computer mouse wrist support assembly of FIG. 4, illustrating the positioning of a user hand hovering over the wrist support subassembly shown at a middle height position.
Figure 9:
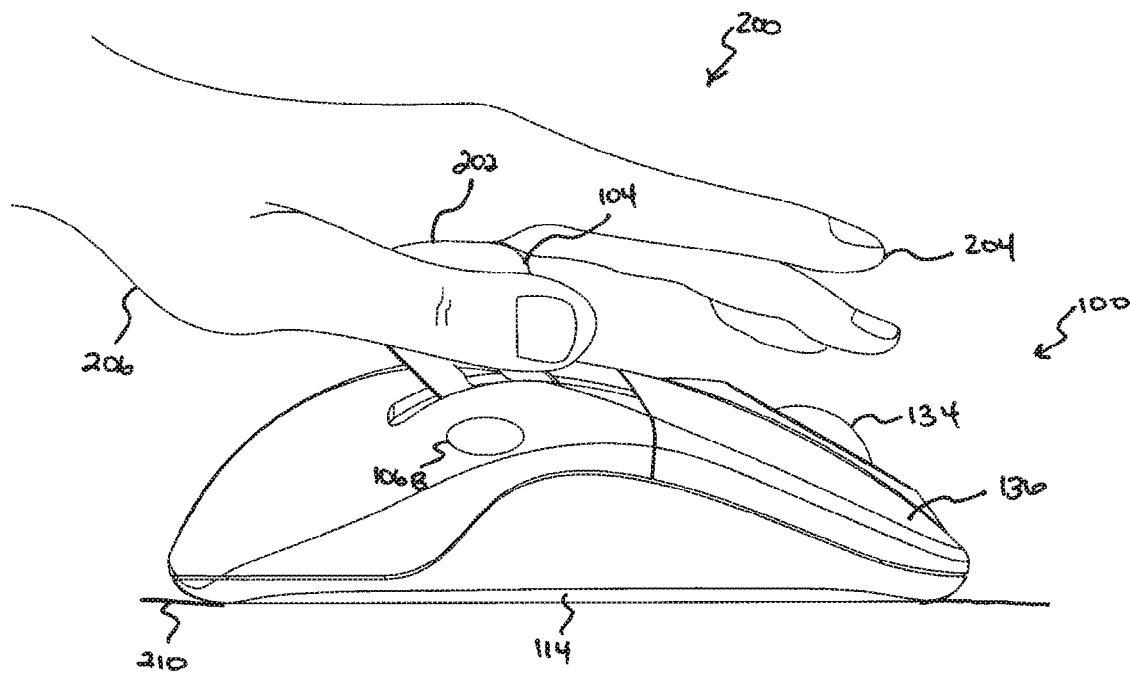
FIG. 9 is a right elevation view of the wireless computer mouse wrist support assembly of FIG. 4, illustrating the positioning of a user hand properly positioned with the wrist support subassembly shown at a middle height position.
Figure 10:
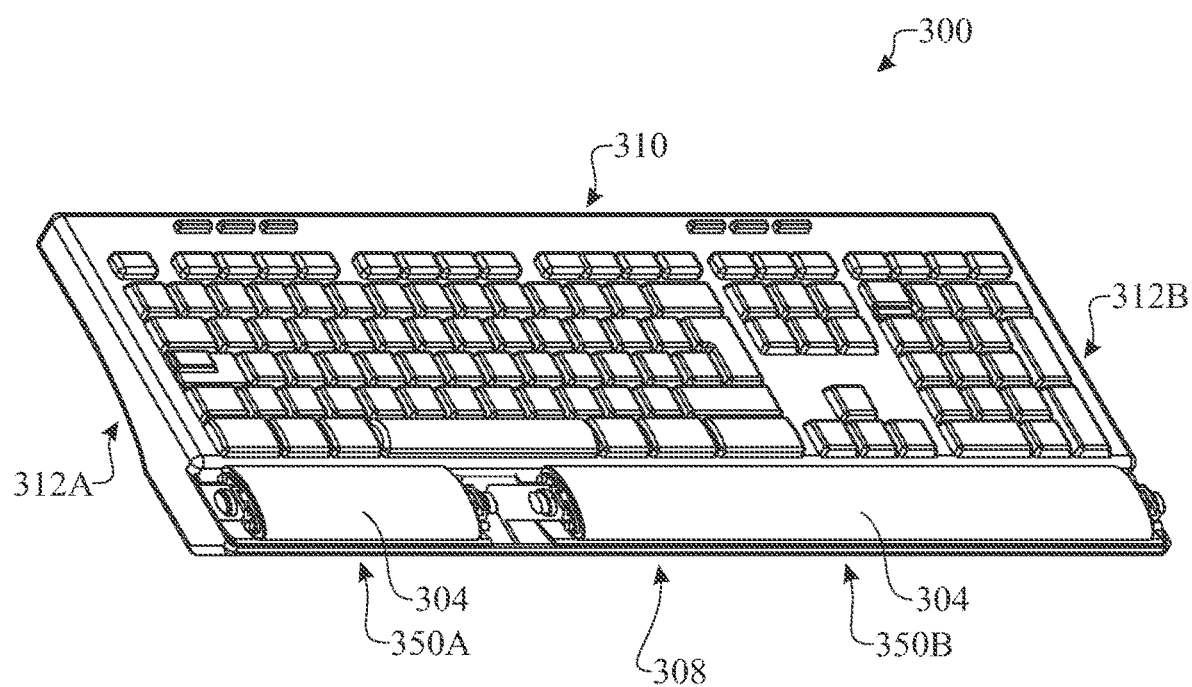
FIG. 10 is a bottom isometric view of a wireless keyboard wrist support system in accordance with a first exemplary implementation.
Figure 11:
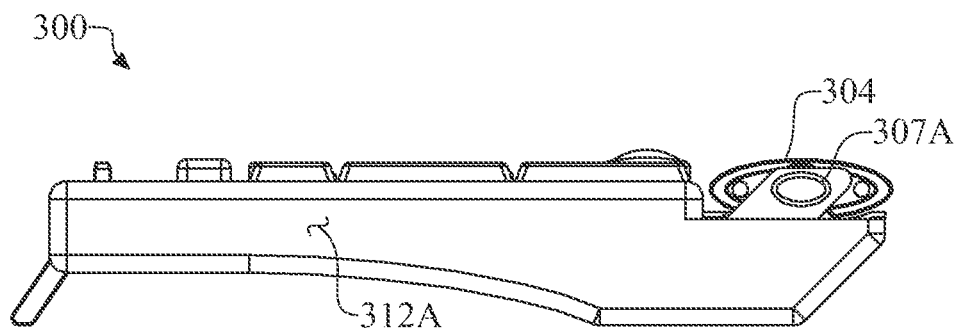
FIG. 11 is a left elevation view of the wireless keyboard wrist support system of FIG. 10.
Figure 12:
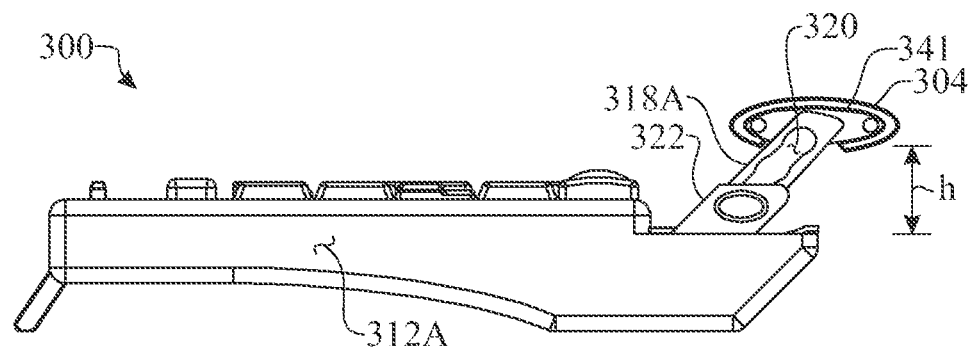
FIG. 12 is a left elevation view of the of the wireless keyboard wrist support system of FIG. 10, with the height adjusting pad shown at the highest possible position.
Figure 13:
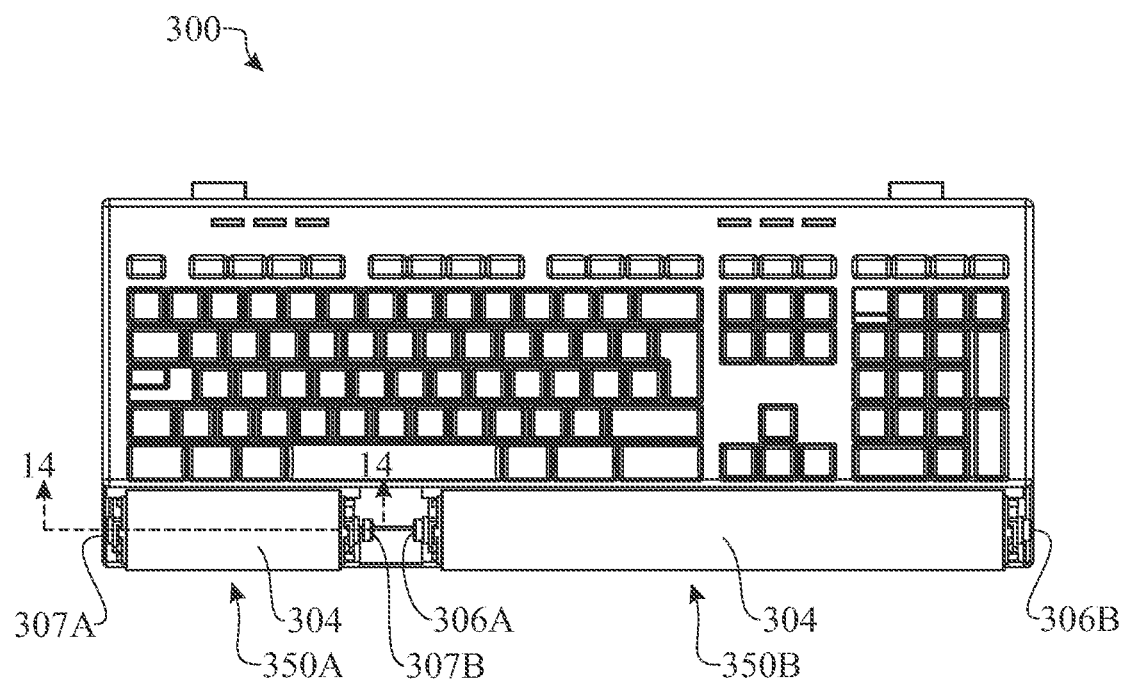
FIG. 13 is a top plan view of the wireless keyboard wrist support system of FIG. 10.

Referring now particularly to FIGS. 8 and 9, a wireless computer mouse assembly 100, includes a user wrist support subassembly 102. The wrist support subassembly is shown at a middle height position, h2. As desired, the wireless computer mouse assembly 100 can be translated about any surface 210 as it rests on its base 114. The base 114 of the mouse assembly 100 can be comprised of already known parts, such as, optical sensors, fasteners, polytetrafluoroethylene (PTFE) pads, or the like. When utilizing the wireless computer mouse 100 a user places his hand's 200 distal palm area 202 on the wrist support pad 104. This ergonomically improves a user hand 200 position by aligning the user's palm 206 with the respect to the positioning of the forearm. While in this ergonomic position the user is not prevented from utilizing their finger 204 to operate the computer mouse 100 scroll wheel 134 or buttons 136.

Referring now to FIGS. 10-17, in an alternate implementation, a wrist support subassembly is provided integrated with a keyboard assembly 300 comprising a keyboard housing 310. The keyboard assembly 300 includes a user wrist support subassembly 350A, 350B comprising support subassembly 350A and support subassembly 350B. Each support subassembly 350A, 350B has a wrist pad 304, readily affixed to the exterior surface of a support platform 341. The wrist support platform 341 of support assembly 350A is integrally molded with a pair of support members 318A, 318B forming a unitary structure. In turn, the wrist support platform 341 of support assembly 350B is integrally molded with a pair of support members 319A, 319B forming a unitary structure. The support members 318A, 318B, 319A, 319B extend into the keyboard housing 310, which includes adjustment guides 322. Preferably, the user wrist support subassembly 350A, 350B is located near the opposite frontal end 308 of the keyboard assembly 300, spanning from the left 312A to the 312B right side of the keyboard assembly 300. As shown particularly on FIG. 10, the support subassembly 350B is approximately twice the length of the support subassembly 350A in order to provide a user a more ergonomic hand position as they use the keyboard assembly 300.

Figure 14:
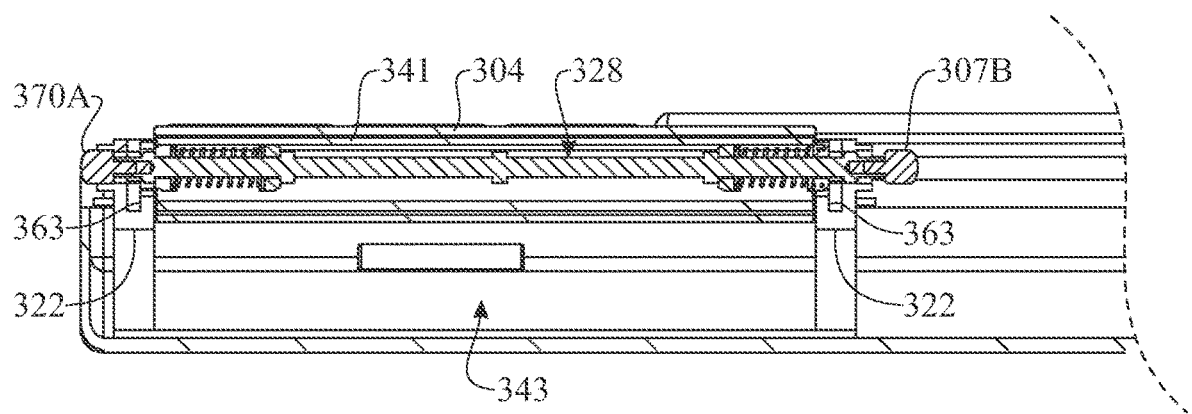
FIG. 14 is an enlarged cross-sectional view of a portion of the wireless keyboard taken along section line 14-14 in FIG. 13.
Figure 15:
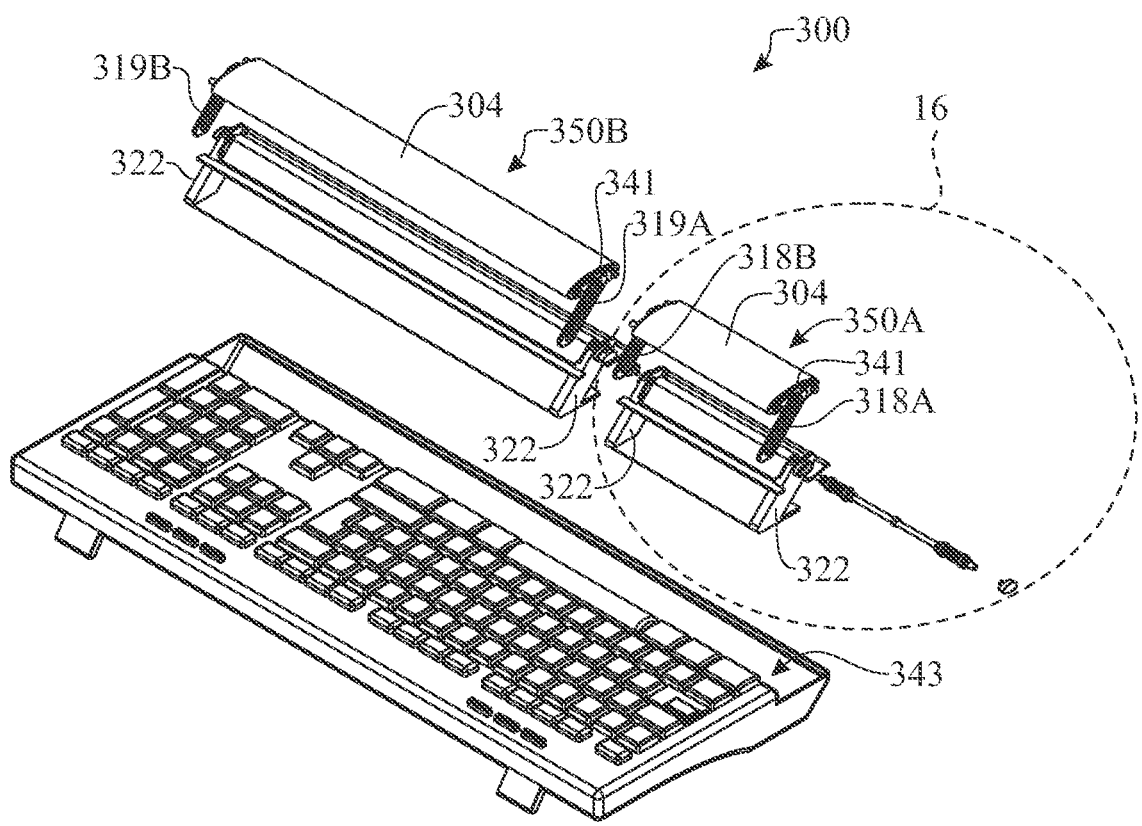
FIG. 15 is a top right isometric exploded view of the of the wireless keyboard wrist support system of FIG. 10.
Figure 16:
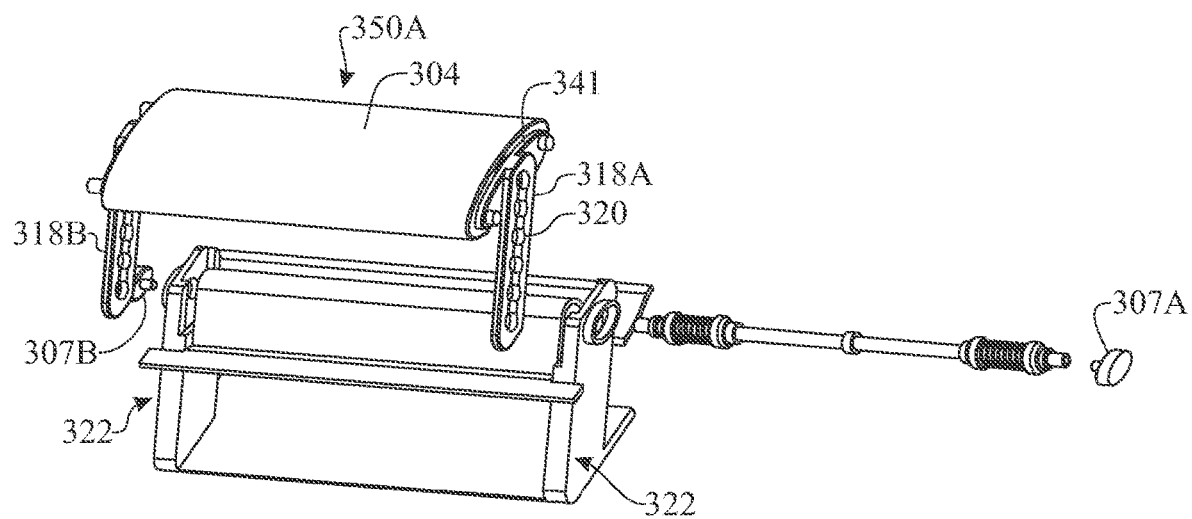
FIG. 16 is an enlarged isometric detailed view of the of the wireless keyboard wrist support system that is enclosed in the dashed circle 16 of FIG. 15.
Figure 17:
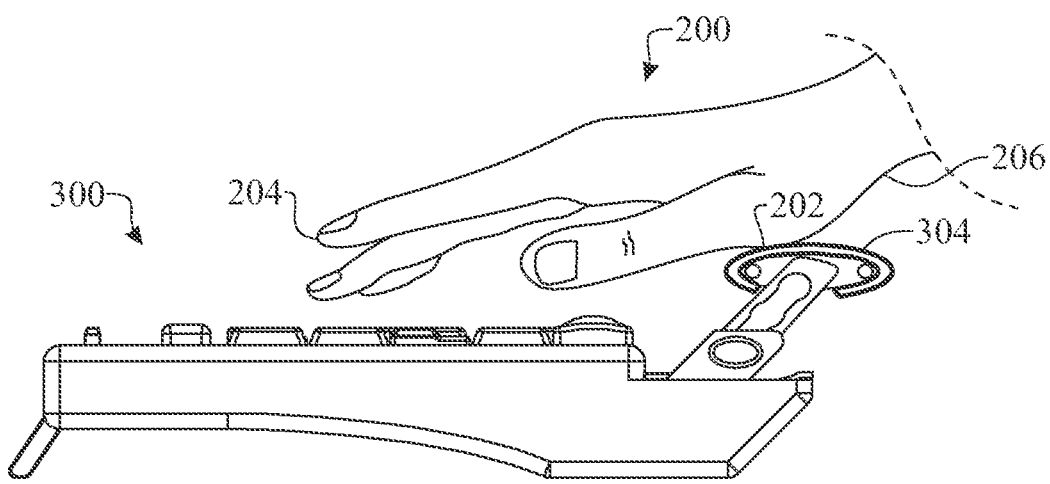
FIG. 17 is a left elevation view of the of the wireless keyboard wrist support system of FIG. 12, illustrating the positioning of a user hand properly positioned with the wrist support portion shown at a maximum height Like reference numerals refer to like parts throughout the several views of the drawings.

As particularly shown on FIGS. 14-16, the wrist support subassembly 350A of the keyboard assembly 300 comprises a pair of actuators 307A, 307B, and the wrist support subassembly 350B of the keyboard assembly 300 comprises a pair of actuators 306A, 306B (the actuators previously described herein above as outwardly extending projections) Each pair of actuators 306A, 306B and 307A, 307B is integrally conjoined to a linear adjustment rack 328, resting upon a support member 363 within a defined cavity 343. The keyboard assembly 300 has an interior cavity to store a rechargeable battery (not shown).

The wrist support subassembly 350A is generally comprised of a wrist support pad 304, which is adhered to the top of the wrist support platform 341 that is integrally molded to support members 318A and 318B. In turn, the wrist support subassembly 350B is generally comprised of a wrist support pad 304, which is adhered to the top of the wrist support platform 341 that is integrally molded to support members 319A and 319B. Much like the wrist support subassembly 102 (FIGS. 4-7), the support members 318A, 318B, 319A, 319B contain a contiguous length of excised steps 320. These excised steps 320 allow, approximately, one degree of freedom per step allowing the user to change the height of the wrist support pad 304 to a desirable height as needed for ultimate comfort. The wrist support subassembly support platform 341 and members 318A, 318B, 319A, 319B are contained inside of a defined cavity 343 within the keyboard assembly 300. The keyboard assembly 300 having the integral wrist support pad support subassembly 350A, 350B functions in a similar manner as described hereinabove with regard to the mouse support pad assembly, when the linear adjustment rack 328 is in respective locked and unlocked positions.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A wireless computer keyboard assembly, comprising:
    a keyboard housing having an upper surface, a lower surface, left and right sides, a front end and rear end together defining a keyboard interior area, a plurality of keys extending upward from said interior area, and a pair of adjustment guides;
    a user wrist support subassembly assembled to said keyboard housing proximate said keyboard front end, the user wrist support subassembly extending laterally between said keyboard left and right sides, a left side of the user wrist support subassembly attached proximate the corresponding left side of the keyboard and a right side of the user wrist support subassembly attached proximate the corresponding right side of the keyboard in a manner enabling the user wrist support subassembly to be extended away from the keyboard front end in an upward and outward direction; wherein
    said wrist support subassembly comprises:
        a wrist support platform;
        a wrist support platform pad disposed upon said wrist support platform for supporting a wrist portion of a hand of an individual during use of said wireless computer keyboard assembly;
        a pair of wrist support platform members integrally formed with said wrist support platform and depending downwardly therefrom, each of said wrist support platform members extending into the keyboard housing, each wrist support platform member having a longitudinally-extending opening therethrough and defined by a perimeter edge in the form of a contiguous series of excised steps; and
        an attachment hardware subassembly for securing said wrist support subassembly to said keyboard housing in a manner enabling selective vertical positioning of said wrist support platform with respect to said keyboard housing.

2. A wireless computer keyboard assembly, comprising:
    a keyboard housing having an upper surface, a lower surface, left and right sides, a front end and rear end together defining a keyboard interior area, a plurality of keys extending upward from said interior area, and adjustment guides;
    a left wrist support subassembly and a right wrist support subassembly assembled to said keyboard housing proximate said keyboard front end in a manner enabling the left and right wrist support subassemblies to be extended away from the keyboard front end in an upward and outward direction, the left and right wrist support subassemblies arranged in a left-to-right, side-by-side relationship with one another and extending laterally between said left and right sides of the keyboard housing, wherein a left side
    of the left wrist support subassembly is attached proximate the left side of the keyboard housing and a right side of the right wrist support subassembly is attached proximate the right side of the keyboard housing; wherein each wrist support subassembly comprises:
- a wrist support platform;
- a wrist support platform pad disposed upon said wrist support platform for supporting a wrist portion of a hand of an individual during use of said wireless computer keyboard assembly;
- a pair of wrist support platform members integrally formed with said wrist support platform and depending downwardly therefrom, each of said wrist support platform members extending into the keyboard housing, each wrist support platform member having a longitudinally-extending opening therethrough and defined by a perimeter edge in the form of a contiguous series of excised steps; and
- an attachment hardware subassembly for securing said wrist support subassembly to said keyboard housing in a manner enabling selective vertical positioning of said wrist support platform with respect to said keyboard housing.

\* \* \* \* \*